(12) United States Patent
Asai et al.

(10) Patent No.: US 10,583,869 B2
(45) Date of Patent: Mar. 10, 2020

(54) FASTENING STRUCTURE FOR VEHICLES

(71) Applicant: FUTABA INDUSTRIAL CO., LTD., Aichi (JP)

(72) Inventors: Yusuke Asai, Aichi (JP); Kotaro Tsuda, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 76 days.

(21) Appl. No.: 15/762,829

(22) PCT Filed: Jan. 21, 2016

(86) PCT No.: PCT/JP2016/051698
§ 371 (c)(1),
(2) Date: Mar. 23, 2018

(87) PCT Pub. No.: WO2017/126080
PCT Pub. Date: Jul. 27, 2017

(65) Prior Publication Data
US 2018/0265139 A1    Sep. 20, 2018

(51) Int. Cl.
*B62D 27/06* (2006.01)
*B62D 25/14* (2006.01)
*B62D 27/02* (2006.01)

(52) U.S. Cl.
CPC ......... *B62D 27/065* (2013.01); *B62D 25/145* (2013.01); *B62D 27/023* (2013.01)

(58) Field of Classification Search
CPC ... B62D 27/065; B62D 27/023; B62D 25/145
(Continued)

(56) References Cited

U.S. PATENT DOCUMENTS

| 2,213,010 A | * | 8/1940 | Macpherson | .......... | B62D 21/09 |
| | | | | | 16/392 |
| 6,431,602 B1 | | 8/2002 | Ralko et al. | | |

(Continued)

FOREIGN PATENT DOCUMENTS

JP    2010105585 A    5/2010

OTHER PUBLICATIONS

International Search Report dated Apr. 6, 2016 for corresponding International Application No. PCT/JP2016/051698, filed Jan. 21, 2016.

(Continued)

*Primary Examiner* — Pinel E Romain
(74) *Attorney, Agent, or Firm* — David D. Brush; Westman, Champlin & Koehler, P.A.

(57) ABSTRACT

A fastening structure for vehicles includes a mounting member, a mounting target member, a spacer member, a bolt member, and a nut member. The mounting member includes a first member and a second member. The first member includes a first mounting portion and a first insertion hole. The second member includes a second mounting portion and a second insertion hole. The first mounting portion overlaps the second mounting portion. The mounting target member includes a bolt insertion hole. The spacer member is attached to the first mounting portion and is arranged between the first mounting portion and the mounting target member. The nut member is attached to the second mounting portion. The bolt member is inserted through the first insertion hole, the second insertion hole, and the bolt insertion hole, and is screw-engaged with the nut member, thereby fixing the mounting member to the mounting target member.

11 Claims, 4 Drawing Sheets

(58) Field of Classification Search
USPC .............................................. 296/193.02, 70
See application file for complete search history.

(56) References Cited

U.S. PATENT DOCUMENTS

| | | | | |
|---|---|---|---|---|
| 7,438,351 | B2* | 10/2008 | Arroupe | B62D 25/147 |
| | | | | 296/193.02 |
| 9,302,716 | B2* | 4/2016 | Sahi | B62D 27/065 |
| 2006/0280579 | A1* | 12/2006 | Seidl | F16B 5/0233 |
| | | | | 411/546 |
| 2010/0303582 | A1 | 12/2010 | Choi et al. | |

OTHER PUBLICATIONS

International Preliminary Report on Patentability dated Aug. 30, 2017 for corresponding International Application No. PCT/JP2016/051698, filed Jan. 21, 2016.
Written Opinion of the International Searching Authority dated Apr. 6, 2016 for corresponding International Application No. PCT/JP2016/051698, filed Jan. 21, 2016.
English translation of the International Preliminary Report on Patentability dated Jul. 26, 2018, for corresponding International Application No. PCT/JP2016/051698, filed Jan. 21, 2016.

* cited by examiner

US 10,583,869 B2

FASTENING STRUCTURE FOR VEHICLES

CROSS-REFERENCE TO RELATED APPLICATIONS

This Application is a Section 371 National Stage Application of International Application No. PCT/JP2016/051698, filed Jan. 21, 2016, which is incorporated by reference in its entirety and published as WO 2017/126080 A1 on Jul. 27, 2017, not in English.

TECHNICAL FIELD

The present disclosure relates to a fastening structure for vehicles.

BACKGROUND ART

There is a known fastening structure that fastens and fixes, for example, in a vehicle, a mounting member and a mounting target member, to which the mounting member is mounted, with a spacer member or the like arranged therebetween using a fastening member, such as a bolt member and a nut member (see Patent Document 1).

PRIOR ART DOCUMENTS

Patent Documents

Patent Document 1: Japanese Unexamined Patent Application Publication No. 2010-105585

SUMMARY OF THE INVENTION

Problems to be Solved by the Invention

In a conventional fastening structure as shown in FIG. 4, however, a nut member 953 is attached to an opposite side of a mounting member 93 relative to a mounting target member 94 by projection welding, a spacer member 951 is attached to a same side of the mounting member 93 relative to the mounting target member 94 by arc welding, and then the mounting member 93 is fixed to the mounting target member 94 with a bolt member 952.

Thus, when one of the spacer member 951 and the nut member 953 is attached to the mounting member 93, the mounting member 93 may be deformed, thereby leading to deterioration of attachment accuracy when attaching the other one. This may also lead to deterioration of assembly accuracy between these members. Further, attachment of the spacer member 951 and the nut member 953 by different welding methods requires complicated work processes.

Accordingly, it is preferable to provide a fastening structure for vehicles that can achieve an improved quality and simplified work processes, as well as an enhanced rigidity.

Means for Solving the Problems

A fastening structure for vehicles in one aspect of the present disclosure comprises: a mounting member; a mounting target member to which the mounting member is mounted; a spacer member arranged between the mounting member and the mounting target member; and a bolt member and a nut member configured to fasten the mounting member to the mounting target member, wherein the mounting member comprises a first member and a second member, the first member comprises a first mounting portion configured to overlap the second member and a first insertion hole formed in the first mounting portion and configured to allow insertion therethrough of the bolt member, the second member comprises a second mounting portion configured to overlap the first member and a second insertion hole formed in the second mounting portion and configured to allow insertion therethrough of the bolt member, the first mounting portion is made to overlap a same side of the second mounting portion relative to the mounting target member, the mounting target member comprises a bolt insertion hole configured to allow insertion therethrough of the bolt member, the spacer member is attached to a same side of the first mounting portion relative to the mounting target member and arranged between the first mounting portion and the mounting target member, the nut member is attached to an opposite side of the second mounting portion relative to the mounting target member, and the bolt member is inserted through the first insertion hole, the second insertion hole, and the bolt insertion hole and is also screw-engaged with the nut member, thereby fixing the mounting member to the mounting target member.

According to the aforementioned fastening structure, the mounting member comprises at least two members (the first member and the second member). Thus, it is possible to attach the spacer member to one of the members (the first mounting portion of the first member) and attach the nut member to the other of the members (the second mounting portion of the second member).

This enables an improved attachment accuracy of the spacer member and the nut member and an improved quality, as compared with a case of attaching both the spacer member and the nut member to a single member. Also, it is possible to attach the spacer member and the nut member by the same method (such as a welding method) to thereby achieve simplification of work processes.

Also, the first mounting portion of the first member and the second mounting portion of the second member are made to overlap, and the overlapped first mounting portion and second mounting portion are fastened and fixed to the mounting target member using the bolt member and the nut member. This enables an enhanced rigidity of a fastened region of the fastening structure.

A fastening structure for vehicles in another aspect of the present disclosure comprises: a mounting member; a mounting target member to which the mounting member is mounted; a bolt member and a fastening member configured to fasten the mounting member to the mounting target member; and a fixing member configured to fix the fastening member to the mounting member, wherein the mounting member comprises a fastening portion having a fastening insertion hole configured to allow insertion therethrough of the fastening member, the mounting target member comprises a bolt insertion hole configured to allow insertion therethrough of the bolt member, the fastening member comprises a spacer portion arranged between the fastening portion and the mounting target member, and a nut portion with which the bolt member is screw-engaged, the fastening member is inserted through the fastening insertion hole and fixed to the fastening portion by the fixing member, and the bolt member is inserted through the bolt insertion hole and screw-engaged with the nut portion, thereby fixing the mounting member to the mounting target member.

According to the aforementioned fastening structure, the fastening member that comprises the spacer portion and the nut portion configured integrally with each other is fixed to the mounting member by the fixing member. Then, the mounting member and the mounting target member are fastened and fixed using the bolt member and the fastening member that is fixed to the mounting member. Thus, it is possible to achieve an improved assembly accuracy between the members and to achieve an improved quality. Also, it is possible to achieve an enhanced rigidity of a fastened region of the fastening structure.

Further, the fastening member, in which the spacer portion and the nut portion are configured integrally with each other, can achieve simplification of members. Moreover, easy assembly of members, and thus simplification of work processes can be achieved.

In the fastening structure for vehicles in the another aspect of the present disclosure, the nut portion may comprise a holding portion that is arranged on an opposite side of the fastening portion relative to the mounting target member, the fixing member may be arranged on a same side of the fastening portion relative to the mounting target member, and the fastening portion may be held by the holding portion and the fixing member. In this case, it is possible to achieve a further enhanced rigidity of the fastened region of the fastening structure.

The fastening structure for vehicles in each of the one aspect and the another aspect of the present disclosure may be used for an instrument panel reinforcement disposed in a vehicle. In this case, it is possible to achieve an improved quality of the instrument panel reinforcement and simplified work processes as well as an enhanced rigidity.

EXPLANATION OF REFERENCE NUMERALS

1 . . . instrument panel reinforcement, 3 . . . brace member (mounting member), 31 . . . first brace (first member), 311 . . . first mounting portion, 312 . . . first insertion hole, 32 . . . second brace (second member), 321 . . . second mounting portion, 322 . . . second insertion hole, 4 . . . vehicle body member (mounting target member), 41 . . . bolt insertion hole, 51 . . . collar (spacer member), 52 . . . bolt member, 53 . . . nut member Mode for Carrying Out the Invention Hereinafter, some embodiments of the present disclosure will be described with reference to the drawings.

Embodiment 1

Figure 1:
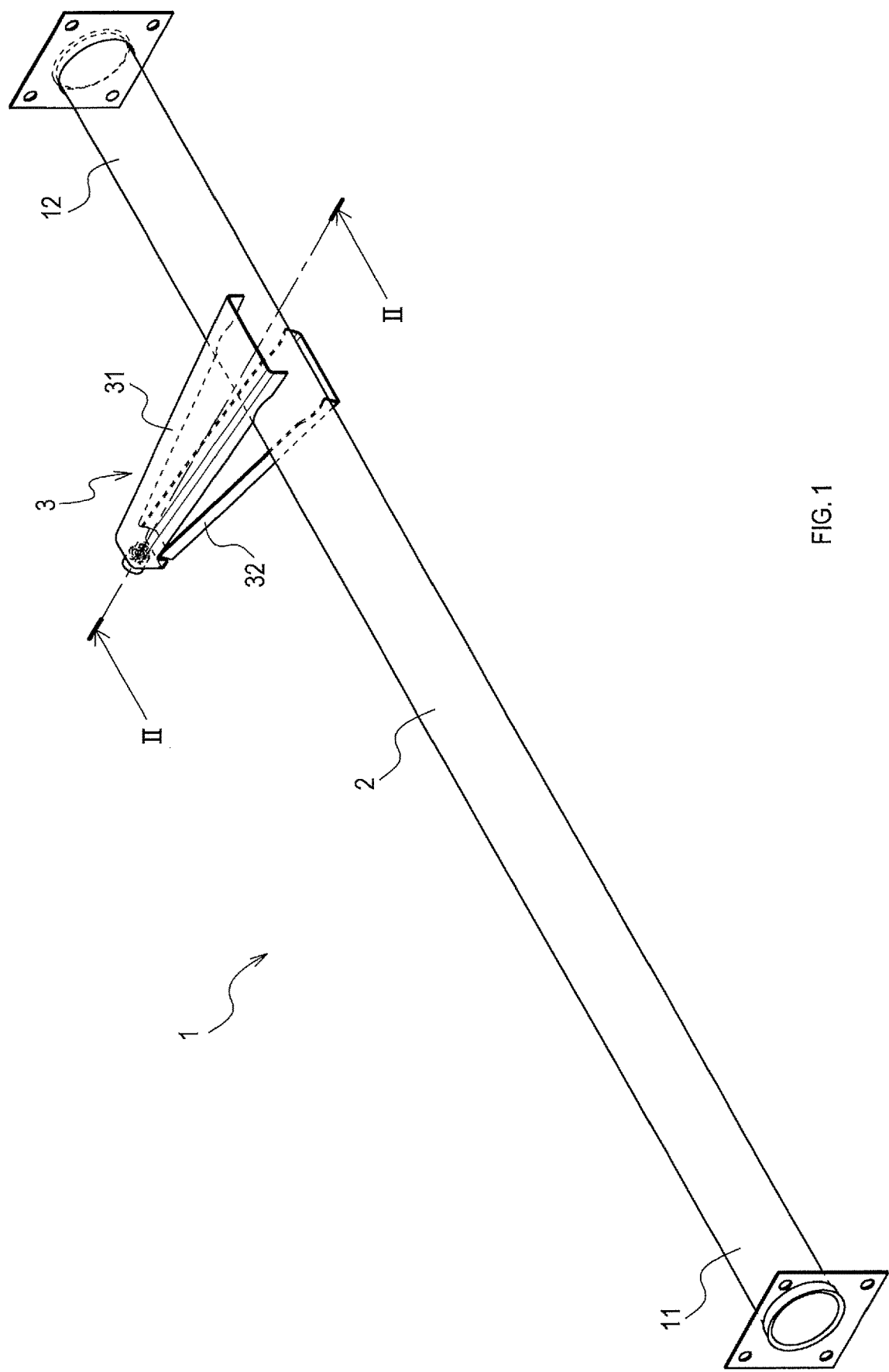
FIG. 1 is a perspective view showing an instrument panel reinforcement of Embodiment 1.

As shown in FIG. 1, an instrument panel reinforcement 1 is a fastening structure to form a vehicle. The instrument panel reinforcement 1 is arranged in an instrument panel (not shown) along a vehicle width direction (a vehicle right-left direction) and between a driver's seat-side pillar (not shown) and a passenger's seat-side pillar (not shown).

Herein, "right and left" in the vehicle right-left direction is intended to mean "right and left" when viewed from the rear of the vehicle toward the front of the vehicle. In the instrument panel reinforcement 1 shown in FIG. 1, a left end 11 (at a passenger's seat side) is located on the left, and a right end 12 (at a driver's seat side) is located on the right.

The instrument panel reinforcement 1 comprises a pipe 2 and a brace member (a mounting member) 3. The pipe 2 comprises an elongated tubular steel material or the like. The pipe 2 supports a steering column (not shown) through a member, such as a bracket.

The brace member 3 comprises two members, which are a first brace (a first member) 31 and a second brace (a second member) 32. The first brace 31 and the second brace 32 each comprise a plate-shaped steel material or the like.

The first brace 31 is arranged on a vehicle upper side of the pipe 2. The second brace 32 is arranged on a vehicle lower side of the pipe 2. An end of the first brace 31 on a vehicle rear side and an end of the second brace 32 on the vehicle rear side are each coupled to the pipe 2 by, for example, welding.

Figure 2:
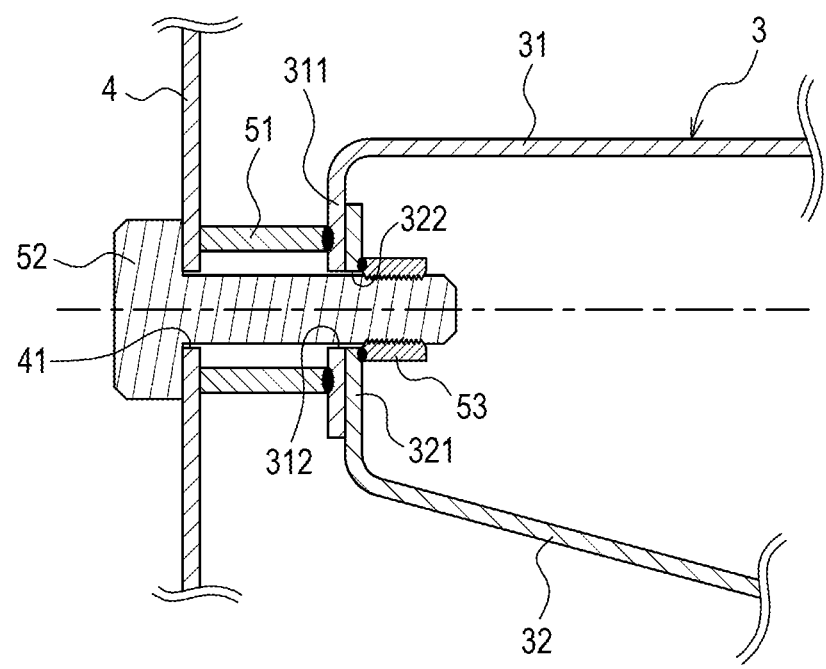
FIG. 2 is a sectional view taken along a line II-II as viewed in an arrow direction in FIG. 1.

As shown in FIG. 2, an end portion of the first brace 31 on a vehicle front side comprises a first mounting portion 311 that is formed to be bent toward the vehicle lower side and is configured to overlap the second brace 32. The first mounting portion 311 comprises a first insertion hole 312 that allows insertion therethrough of a bolt member 52 described below.

An end portion of the second brace 32 on the vehicle front side comprises a second mounting portion 321 that is formed to be bent toward the vehicle upper side and is configured to overlap the first brace 31. The first mounting portion 311 comprises a second insertion hole 322 that allows insertion therethrough of the bolt member 52 described later.

The first mounting portion 311 of the first brace 31 and the second mounting portion 321 of the second brace 32 overlap each other such that the first mounting portion 311 is located more forward in the vehicle than the second mounting portion 321 (closer to a vehicle body member 4 described later).

The vehicle body member (a mounting target member) 4 is arranged on the vehicle front side of the brace member 3 (the first brace 31, the second brace 32). The vehicle body member 4 is a member to be arranged in an instrument panel. The vehicle body member 4 comprises a bolt insertion hole 41 that allows insertion therethrough of the below-described bolt member 52.

A cylindrical collar (a spacer member) 51 is arranged between the brace member 3 and the vehicle body member 4. The collar 51 comprises one end that is joined to a surface of the first mounting portion 311 of the first brace 31 facing the vehicle body member 4 by projection welding. Respective ends of the collar 51 abut the first mounting portion 311 of the first brace 31 and the vehicle body member 4.

The brace member 3 and the vehicle body member 4 are fastened and fixed by the bolt member 52 and a nut member 53. One end of the nut member 53 having a cylindrical shape is joined by projection welding to an opposite surface of the second mounting portion 321 of the second brace 32 relative to the vehicle body member 4.

The bolt member 52 is inserted from the vehicle front side of the vehicle body member 4 (opposite to the brace member 3) through the bolt insertion hole 41 of the vehicle body member 4, inside of the collar 51, the first insertion hole 312 of the first brace 31, the second insertion hole 322 of the second brace 32, and inside of the nut member 53, in this order.

Also, the bolt member 52 comprises a male thread provided around an outer peripheral surface thereof, and the male thread is screw-engaged with a female thread provided along an inner peripheral surface of the nut member 53. As a result, the bolt member 52 and the nut member 53 fasten and fix the brace member and the vehicle body member 4.

Next, a description will be given of the operation and effects of embodiment 1.

In Embodiment 1, the brace member 3 comprises at least two members (the first brace 31 and the second brace 32). Thus, it is possible to attach the collar 51 to one of the members (the first mounting portion 311 of the first brace 31) and to attach the nut member 53 to the other of the members (the second mounting portion 321 of the second brace 32).

Accordingly, enhancement in attachment accuracy of the collar 51 and the nut member 53 and improvement in quality can be achieved as compared with a case of attaching both a collar and a nut member to a single member. Also, the collar 51 and the nut member 53 may be attached by the same method (such as a welding method), thereby achieving simplification of work processes.

Further, the first mounting portion 311 of the first brace 31 and the second mounting portion 321 of the second brace 32 overlap each other, and the overlapping first and second mounting portions 311 and 321 and the vehicle body member 4 are fastened and fixed using the bolt member 52 and the nut member 53. Thus, an enhanced rigidity of a fastened region can be achieved.

Embodiment 2

Figure 3:
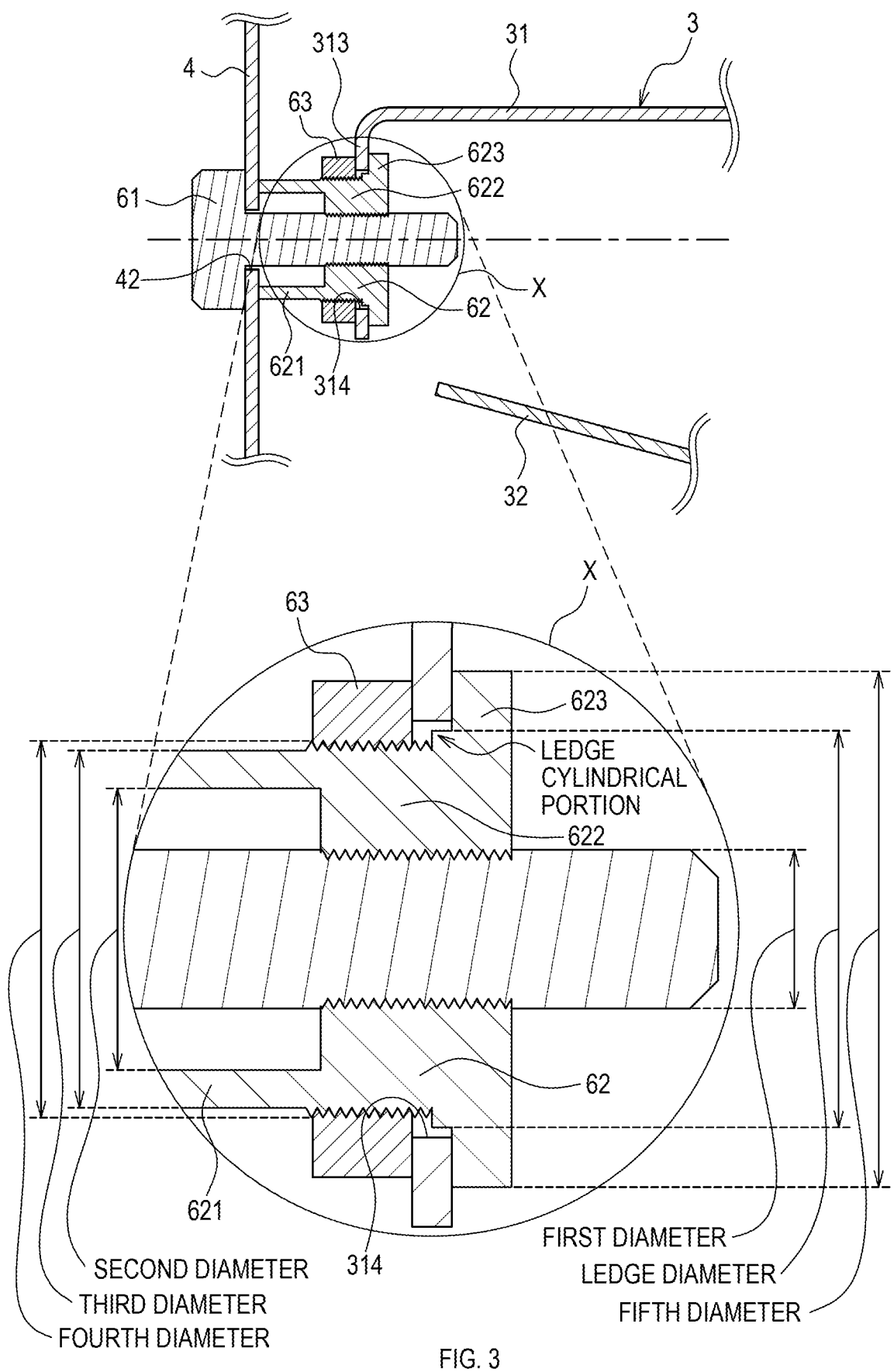
FIG. 3 is a sectional view showing a part corresponding to FIG. 2 of an instrument panel reinforcement of Embodiment 2.
Figure 4:
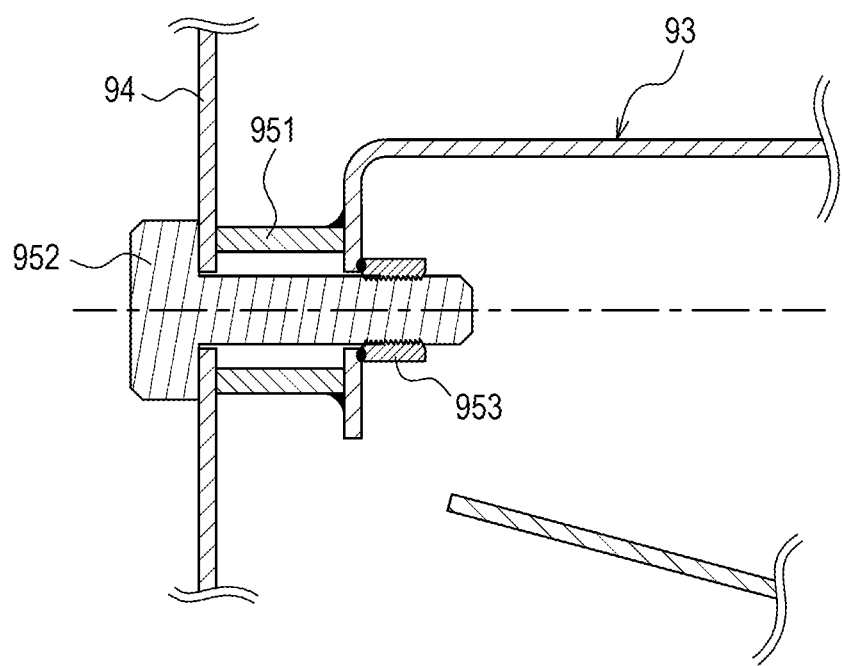
FIG. 4 is a sectional view showing a part of a conventional fastening structure corresponding to FIG. 2.

As shown in FIG. 3, Embodiment 2 is different from Embodiment 1 as described above in configuration of fastening and fixing the brace member 3 and the vehicle body member 4. Other basic configurations are similar to those in Embodiment 1, and configurations common to those in Embodiment 1 will be assigned the same reference numerals and will not be described further.

The brace member 3 comprises two members, that is, the first brace (mounting member) 31 and the second brace 32 coupled to each other.

An end portion of the first brace 31 on the vehicle front side comprises a fastening portion 313 that is formed to be bent toward the vehicle lower side. The fastening portion 313 comprises a fastening insertion hole 314 formed to allow insertion therethrough of a fastening member 62 described below. The vehicle body member 4 comprises a bolt insertion hole 42 formed to allow insertion therethrough of a bolt member 61 described below.

The fastening member 62 is arranged between the brace member 3 (the first brace 31) and the vehicle body member 4. The fastening member 62 is inserted through the fastening insertion hole 314 of the fastening portion 313 of the first brace 31.

The fastening member 62 comprises a cylindrical collar portion (a spacer portion) 621 that is arranged between the fastening portion 313 of the first brace 31 and the vehicle body member 4, and a cylindrical nut portion 622 with which the below-described bolt member 61 is screw-engaged. The collar portion 621 and the nut portion 622 are configured to partially overlap each other in an axial direction.

The nut portion 622 comprises a holding portion 623 that is arranged on the opposite side of the fastening portion 313 of the first brace 31 relative to the vehicle body member 4. The holding portion 623 has an outer diameter greater than an inner diameter of the fastening insertion hole 314 of the fastening portion 313 of the first brace 31.

The fastening member 62 is fixed to the fastening portion 313 of the first brace 31 by a fixing member 63. The fixing member 63, having a cylindrical shape is fit around the fastening member 62. A female thread provided on an inner peripheral surface of the fixing member 63 is screw-engaged with a male thread provided on an outer peripheral surface of the nut portion 622 of the fastening member 62.

The fixing member 63 is arranged on the same side of the fastening portion 313 of the first brace 31 relative to the vehicle body member 4. The fastening portion 313 of the first brace 31 is held between the holding portion 623 of the fastening member 62 and the fixing member 63. As a result, the fastening member 62 is fixed to the fastening portion 313 of the first brace 31 by the fixing member 63.

The brace member 3 (the first brace 31) and the vehicle body member 4 are fastened and fixed by the bolt member 61 and the fastening member 62. The bolt member 52 is inserted from a vehicle front-side (opposite to the brace member 3) of the vehicle body member 4 through, in the order of, the bolt insertion hole 42 of the vehicle body member 4, inside of the collar portion 621 of the fastening member 62, and the fastening insertion hole 314 of the first brace 31 (specifically, inside of the nut portion 622 of the fastening member 62).

Also, a male thread provided on an outer peripheral surface of the bolt member 61 is screw-engaged with a female thread provided on an inner peripheral surface of the nut portion 622 of the fastening member 62. As a result, the bolt member 61 and the fastening member 62 fasten and fix the brace member 3 (the first brace 31) and the vehicle body member 4.

Next, a description will be given of the operation and effects of Embodiment 2.

In Embodiment 2, the fastening member 62 that comprises the collar portion 621 and the nut portion 622, which are integrated with each other, is fixed to the first brace 31 of the brace member 3 by the fixing member 63. Also, the first brace 31 of the brace member 3 and the vehicle body member 4 are fastened and fixed by using the bolt member 61 and the fastening member 62 that is fixed to the first brace 31. Accordingly, an improved assembly accuracy between the members, and thus an improved quality can be achieved. Also, an enhanced rigidity of a fastened region can be achieved.

Further, the fastening member 62 that comprises the collar portion 621 and nut portion 622 integrated with each other achieves simplification of members. Also, easy assembly of members, and thus simplification of work processes can be achieved. Further, since the fastening member 62 is fixed by the fixing member 63 and welding or the like is not required to fix the fastening member 62, much easier assembly of members, and thus further simplification of work processes can be achieved.

Moreover, the nut portion 622 of the fastening member 62 comprises the holding portion 623, and the fastening portion 313 of the first brace 31 is held by the holding portion 623 of the fastening member 62 and the fixing member 63. Accordingly, a further enhanced rigidity of the fastened region can be achieved.

Other Embodiments

It is to be understood that the present disclosure is not limited to the above-described embodiments and the like, but may be practiced in various forms within a scope not departing from the present disclosure.

(1) In Embodiments 1 and 2 described above, the brace member 3 or the first brace 31 is exemplified as the mounting member, and the vehicle body member 4 is exemplified as the mounting target member; however, the mounting member and the mounting target member are not limited to those, and any members that form a vehicle and are fastened and fixed to each other may be employed.

(2) In Embodiments 1 and 2 described above, the first brace 31 and the second brace 32 of the brace member 3 are arranged in a vertical relationship; however, the positional relationship or the like of the first brace 31 and the second brace 32 is not limited to this, and the first brace 31 and the second brace 32 may be arranged, for example, in a horizontal relationship.

(3) In Embodiment 1 described above, the brace member 3 is formed of two members, that is, the first brace 31 and the second brace 32; however, the number of members forming the brace member 3 is not limited to two, and the brace member 3 may be formed of three or more members.

(4) In Embodiment 1 described above, the collar 51 is joined to the first mounting portion 311 of the first brace 31 by projection welding, and the nut member 53 is joined to the second mounting portion 321 of the second brace 32 by projection welding; however, a method for attachment of the collar 51 and the nut member 53 is not limited to this, but may be, for example, another welding method, an attachment method other than welding, and the like.

(5) In Embodiment 2 described above, the brace member 3 is formed of two members, that is, the first brace 31 and the second brace 32; however, the number of members forming the brace member 3 is not limited to two, and the brace member 3 may be formed of a single member or may be formed of three or more members.

(6) In Embodiment 2 described above, the fastening member 62 is fixed to the first brace 31 of the brace member 3 using the fixing member 63; however, the fastening member 62 may be, for example, welded to the first brace 31 of the brace member 3, and then fixed further using the fixing member 63. In this case, the fastening member 62 can be fixed more firmly, and a further enhanced rigidity of the fastened region can be achieved.

(7) A function performed by a single element in the above-described embodiments may be achieved by a plurality of elements, or a function performed by a plurality of elements may be achieved by a single element. Also, at least a part of a configuration in the above-described embodiments may be replaced by a known configuration having a similar function. Further, a part of a configuration in the above-described embodiments may be omitted as long as it is possible to solve the problems to be solved. Moreover, at least a part of a configuration in the above-described embodiments may be added to, or may replace, a configuration in other embodiment described above. Any form included in the technical idea defined by the language of the claims may be an embodiment of the present disclosure.

The invention claimed is:

1. A fastening structure for vehicles comprising:
a mounting member;
a mounting target member to which the mounting member is mounted;
a spacer member arranged between the mounting member and the mounting target member; and
a bolt member and a nut member configured to fasten the mounting member to the mounting target member,
the mounting member comprising a first member and a second member,
the first member comprising a first mounting portion configured to overlap the second member and a first insertion hole formed in the first mounting portion and configured to allow insertion therethrough of the bolt member,
the second member comprising a second mounting portion configured to overlap the first member and a second insertion hole formed in the second mounting portion and configured to allow insertion therethrough of the bolt member,
a rear side of the first mounting portion being made to overlap a front side of the second mounting portion, such that the rear side of the first mounting portion is pressed against the front side of the second mounting portion as the bolt member is screwed into the nut member,
the mounting target member comprising a bolt insertion hole configured to allow insertion therethrough of the bolt member,
the spacer member being welded to a front side of the first mounting portion and arranged between the first mounting portion and the mounting target member,
the nut member being welded to a rear side of the second mounting portion relative to the mounting target member,
the bolt member being inserted through the bolt insertion hole, the first insertion hole, and the second insertion hole, and also screw-engaged with the nut member, thereby fixing the mounting member to the mounting target member.

2. A fastening structure for vehicles comprising:
a mounting member;
a mounting target member to which the mounting member is mounted;
a bolt member, a fastening member configured to fasten the mounting member to the mounting target member; and
a fixing member configured to fix the mounting member against the fastening member,
wherein the fastening member includes fastening internal threads configured to mate with bolt external threads of the bolt member,
wherein the fixing member includes fixing internal threads configured to mate with fastening outer threads of the fastening member,
the mounting member comprising a fastening portion having a fastening insertion hole configured to allow insertion therethrough of the fastening member,
the mounting target member comprising a bolt insertion hole configured to allow insertion therethrough of the bolt member,
the fastening member comprising a spacer portion arranged between the fastening portion and the mounting target member, and also comprising a nut portion with which the bolt member is screw-engaged,
wherein the fastening member is inserted through the fastening insertion hole and fixed to the fastening portion by the fixing member, and
the bolt member being inserted through the bolt insertion hole and screw-engaged with the nut portion, thereby fixing the mounting member to the mounting target member.

3. The fastening structure for vehicles according to claim 2,
wherein the nut portion comprises a holding portion that contacts a rear surface of the fastening portion, the fixing member contacts a front surface of the fastening portion, and the fastening portion is held by the holding portion and the fixing member.

4. The fastening structure for vehicles according to claim 1, wherein the fastening structure forms an instrument panel reinforcement disposed in a vehicle.

5. The fastening structure for vehicles according to claim 2, wherein the fastening structure forms an instrument panel reinforcement disposed in a vehicle.

6. The fastening structure for vehicles according to claim 3, wherein the fastening structure forms an instrument panel reinforcement disposed in a vehicle.

7. A fastening member for an instrument panel reinforcement, the fastening member comprising:
 a nut portion defining a first hole and a central axis, wherein the central axis extends frontward and rearward;
 a cylindrical collar portion extending frontwards from the nut portion and located coaxially with the central axis; and
 a holding portion extending radially outward from a rear section of the nut portion,
 wherein the nut portion includes:
  internal nut threads configured to mate with bolt threads of a bolt member, and extending substantially completely along the first hole,
 wherein the cylindrical collar portion includes:
  a cylindrical internal surface defining a second diameter that is greater than the first diameter, and
  a cylindrical external surface defining a third diameter that is greater than the second diameter, and
 wherein the nut portion further includes:
  external nut threads located on a forward section of the nut portion and defining a fourth diameter that is greater than the third diameter, such that the external nut threads are configured to mate with internal fixing threads of a fixing member.

8. The fastening member of claim 7,
 wherein a radially outer surface of the holding portion defines a fifth diameter that is greater than fourth diameter,
 wherein a front surface of the holding portion is configured to seat against a rear surface of a fastening portion that includes a fastening insertion hole,
 wherein the fifth diameter is greater than the fastening insertion hole,
 wherein the fourth diameter is less than the fastening insertion hole, such that the external nut threads pass through the fastening insertion hole, such that the holding portion does not pass through the fastening insertion hole, and such that the fixing member threaded rearward onto the external nut threads contacts a front surface of the fastening portion and presses a rear surface the fastening portion against the front surface of the holding portion.

9. The fastening member of claim 8,
 wherein the cylindrical external surface of the cylindrical collar portion is configured to permit the fixing member to slide rearwards until engaging the outer nut threads.

10. The fastening member of claim 9,
 wherein the nut portion further includes:
  a cylindrical ledge located between the external threads and the holding portion, wherein an outer surface of the cylindrical ledge defines a ledge diameter,
 wherein the ledge diameter is greater than the fourth diameter, such that the internal surface of the fastening insertion hole contacts an outer surface of the cylindrical ledge and is prevented from contacting the external nut threads, and
 wherein the ledge diameter is less than the fifth diameter.

11. The fastening member of claim 10,
 wherein the cylindrical ledge has a ledge width approximately equal to half of a thickness of the fastening portion, such that the fixing member clamps the fastening portion against the front surface of the holding portion without interference from the cylindrical ledge.

* * * * *